US006826966B1

United States Patent
Karbassi et al.

(10) Patent No.: US 6,826,966 B1
(45) Date of Patent: Dec. 7, 2004

(54) FLOW SENSOR PACKAGE

(75) Inventors: Said Karbassi, Nashua, NH (US); D. Joseph Maurer, Pearl City, IL (US)

(73) Assignee: Honeywell International Inc., Morristown, NJ (US)

( * ) Notice: Subject to any disclaimer, the term of this patent is extended or adjusted under 35 U.S.C. 154(b) by 174 days.

(21) Appl. No.: 09/634,507

(22) Filed: Aug. 9, 2000

(51) Int. Cl.[7] .............................. G01F 1/37; G01F 1/34
(52) U.S. Cl. .................................. 73/861.52; 73/861.42
(58) Field of Search ........................... 73/861.52, 861.42

(56) References Cited

U.S. PATENT DOCUMENTS

| 4,240,294 A | * | 12/1980 | Grande | 600/486 |
| 4,466,290 A | * | 8/1984 | Frick | 73/756 |
| 4,555,952 A | * | 12/1985 | Jenkins | 73/718 |
| 5,184,107 A | * | 2/1993 | Maurer | 338/42 |
| 5,412,994 A | * | 5/1995 | Cook et al. | 73/756 |
| 5,445,035 A | * | 8/1995 | Delajoud | 138/40 |

* cited by examiner

Primary Examiner—Edward Lefkowitz
Assistant Examiner—Lilybett Martir
(74) Attorney, Agent, or Firm—Kris T. Fredrick

(57) ABSTRACT

A flow sensor package with a housing, a pressure sensing element, a restriction, and an elastomeric seal. The housing has a base, a cover, an inlet port, an outlet port, and first and second channels. The first and second channels are in parallel between the inlet port and the outlet port. The pressure sensing element is in the first channel and the restriction is the second channel. The elastomeric seal engages the pressure sensing element to prevent flow of a fluid, which may be a liquid, through the first channel. The elastomeric seal has a conductive path from the pressure sensing element to a lead, which extends outside the housing.

25 Claims, 4 Drawing Sheets

FLOW SENSOR PACKAGE

BACKGROUND OF THE INVENTION

The present invention relates generally to a package for solid state electronic flow sensors compatible with liquids or gases.

Typical flow sensors use solid state sensing elements that are not compatible with liquids. Moreover, these devices require complicated packaging schemes to mount the sensing element and to protect that element from the fluid passing through the flow sensor package.

A packaging scheme is known for a pressure gauge such that the pressure gauge can be used to detect the pressure of either a liquid or a gas. The package of this pressure gauge includes a solid state pressure sensing element and elastomeric seals. The pressure gauge detects any change in pressure of a fluid. One of the elastomeric seals is conductive so as to connect signals from the solid state pressure sensing element to electrical leads that exit the housing of the pressure gauge. This type of pressure gauge is shown in U.S. Pat. No. 5,184,107 issued to Dean J. Maurer on Feb. 2, 1993. This pressure gauge, however, is not a flow sensor and, therefore, is not in the fluid channel.

The present invention integrates a pressure sensing element and a restriction into a low-cost, highly-manufacturable flow sensor package. This packaging arrangement exposes the pressure sensing element to the gas or fluid flow but protects the pressure sensing element from the gas or fluid without the need for other protective devices.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

In accordance with one aspect of the present invention, a flow sensor package comprises a housing, a sensing element, a restriction, and an elastomeric seal. The housing has an inlet port, an outlet port, and first and second channels between the inlet port and the outlet port. The sensing element is in the first channel. The restriction is in the second channel. The elastomeric seal engages the sensing element so as to prevent flow of a gas or fluid through the first channel.

In accordance with another aspect of the present invention, a flow sensor package comprises a housing, a sensing element, a restriction, and an elastomeric seal. The housing has an inlet port, an outlet port, and first and second channels between the inlet port and the outlet port. The sensing element is in the first channel. The restriction is in the second channel, and permits flow of a liquid through the inlet port, the second channel, and the outlet port. The sensing element senses a pressure drop across the restriction. The elastomeric seal engages the sensing element so as to prevent flow of a liquid through the first channel.

In accordance with yet another aspect of the present invention, a method of determining flow rate through a flow conductor comprises the following steps: creating a pressure drop within a housing; sensing the pressure drop, preferably using a sensing element mounted within the housing; sealing the sensing element within the housing using a seal; and communicating a signal from the sensing element through the seal to an exterior of the housing.

The novel features of the present invention will become apparent to those of skill in the art upon examination of the following detailed description of the invention or can be learned by practice of the present invention. It should be understood, however, that the detailed description of the invention and the specific example presented, while indicating certain embodiments of the present invention, are provided for illustration purpose only because various changes and modifications within the scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

Figure 1A:
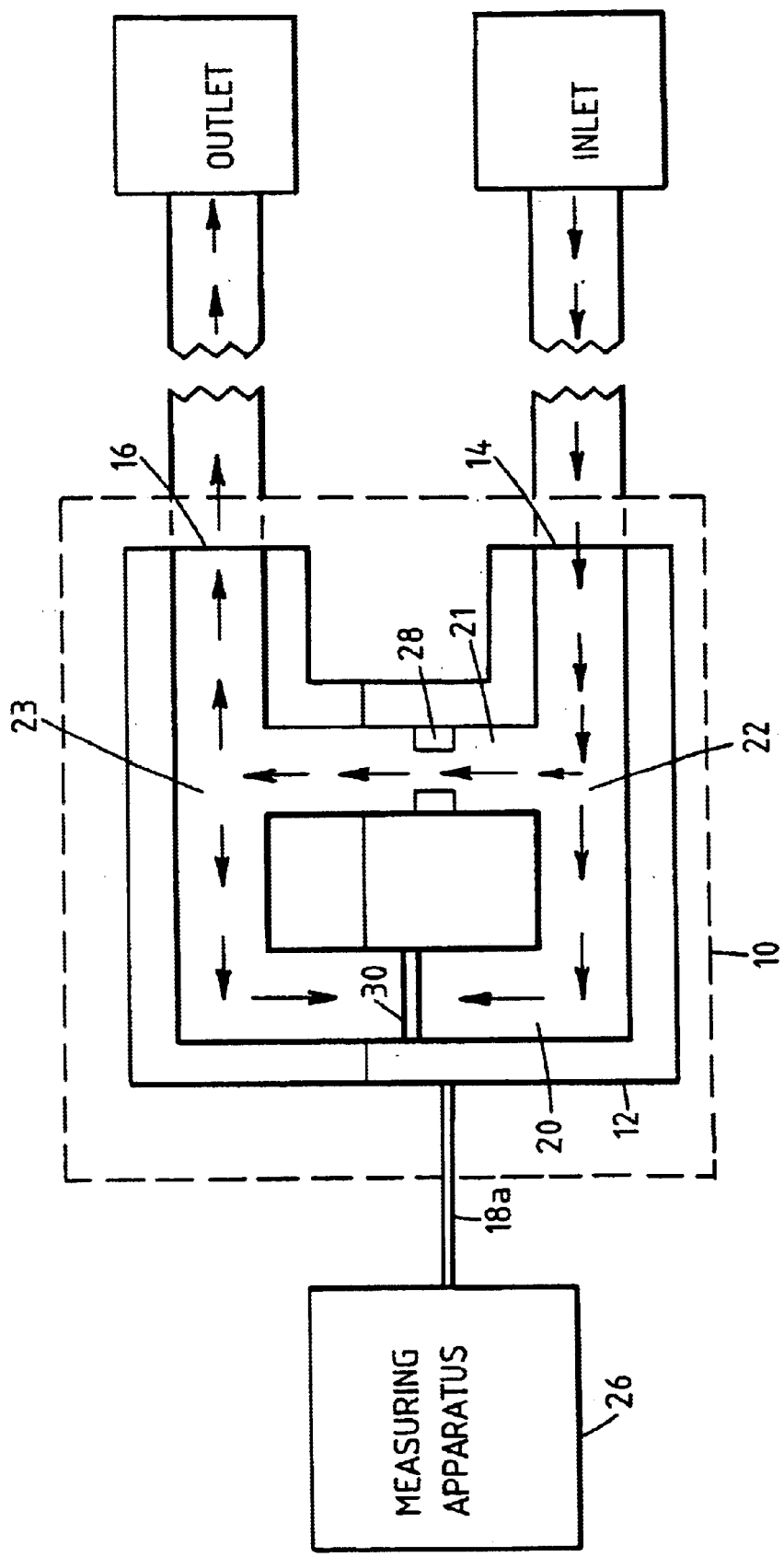
FIGS. 1a and 1b are block diagrams of a flow system incorporating a flow sensor in accordance with the present invention.

As shown in FIG. 1a, a flow sensor package 10 includes a housing 12 that can be fabricated from a suitable material, such as plastic, and that has an inlet port 14, an outlet port 16, a lead 18a, and first and second channels 20, 21, and third and fourth channels 22, 23. In a preferred embodiment, the first and second channels 20, 21 are parallel to one another and communicate with the inlet port 14 and the outlet port 16 by way of the third and fourth channels 22, 23. The inlet port 14 is adapted to receive a fluid such as a liquid, and the outlet port 16 can be adapted to discharge the fluid from the flow sensor package 10. The lead 18a is coupled to a measuring apparatus 26 such as, but not limited to, a microprocessor, a meter, etc.

Figure 3:
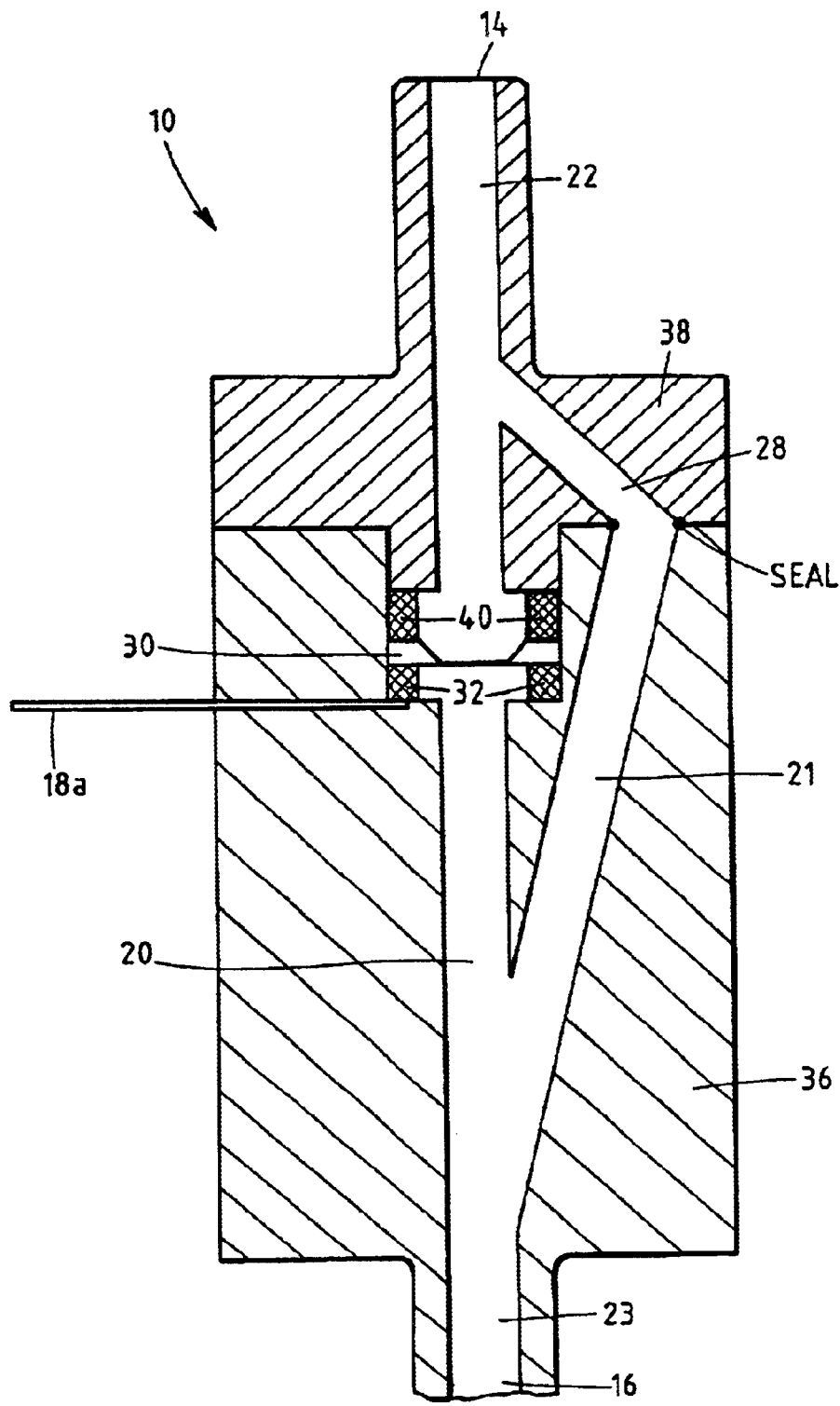
FIG. 3 illustrates a block diagram of an alternate embodiment of a flow system incorporating a flow sensor in accordance with the present invention.

The second channel 21 has a restriction 28. Restriction 28 can be a Venturi configuration (as shown in FIG. 3), which greatly increases velocity but can also reduce pressure and which can be adjusted. Alternatively, the restriction 28 can be provided by narrowing the second channel 21 with respect to the first channel 20 and the third and fourth channels 22, 23 rather than incorporating a restriction 28. The first channel 20 has a pressure sensing element 30 that can be, for example, a strain sensor (e.g., capacitive), a stress sensor or a piezoresistive pressure transducer with a conductive elastomeric seal as described in U.S. Pat. No. 5,184,107 issued to Dean J. Maurer on Feb. 2, 1993, the disclosure of which is incorporated herein by reference although those skilled in the art will realize that other types of seals can be substituted depending on the application. As discussed further below, the pressure sensing element 30 is adapted to detect a pressure change created by the restriction 28 and is coupled to the lead 18a as shown in detail in U.S. Pat. No. 5,184,107. Similarly, those skilled in the art will realize that other sensing elements can be used in accordance with the teaching of the present invention such as, for example, a temperature sensing element.

Figure 1B:
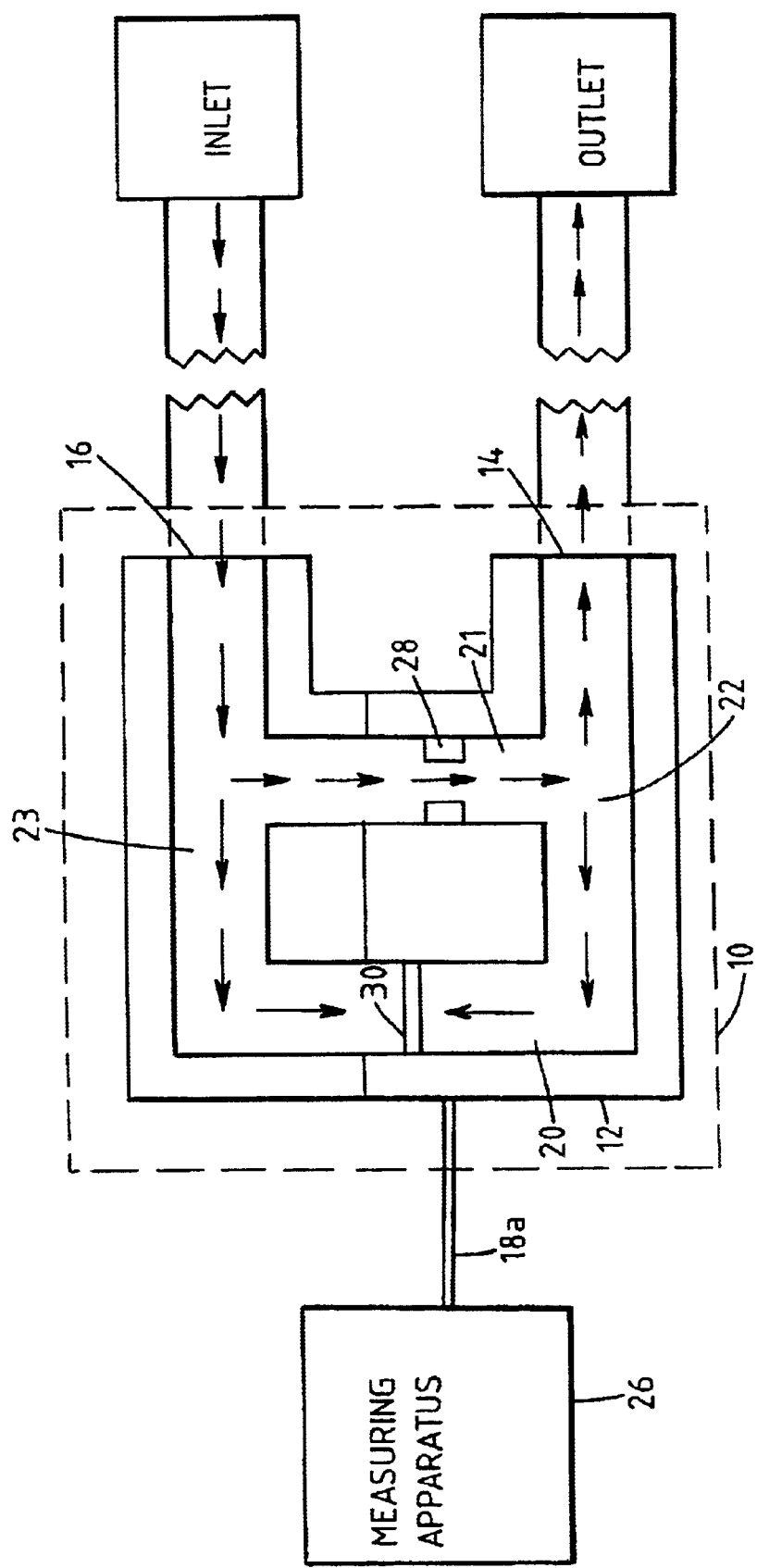

As described above, the inlet port 14 receives a fluid, and the outlet port 16 discharges the fluid from the flow sensor package 10. However, as further discussed below and as shown in FIG. 1b, the flow sensor package 10 is bidirectional. In either case, the fluid moves through the flow sensor package 10 by flowing through the restriction 28 in the second channel 21. The restriction 28 in the second channel 21 creates a pressure drop from one face of the pressure sensing element 30 to the other in the first channel 20. The pressure sensing element 30 and a pair of elastomeric seals (discussed below in connection with FIG. 2) prevent flow of the fluid through the first channel 20 and measures the pressure drop created by the restriction 28. Accordingly, the pressure sensing element 30 sends a signal, for example, a voltage, to the measuring apparatus 26 through the lead 18a.

As exemplified in FIG. 1a, the fluid flows through the flow sensor package 10 in a clockwise orientation by entering through the inlet port 14 and exiting through the outlet port 16. Alternatively, as noted above, the flow sensor package 10 can be bidirectional. Accordingly, as exemplified in FIG. 1b, the fluid flows through the flow sensor package 10 in a counter-clockwise orientation by entering through the outlet port 16 and exiting through the inlet port 14. In particular, the outlet port 16 receives the fluid, and the inlet port 14 discharges the fluid from the flow sensor package 10.

Figure 2:
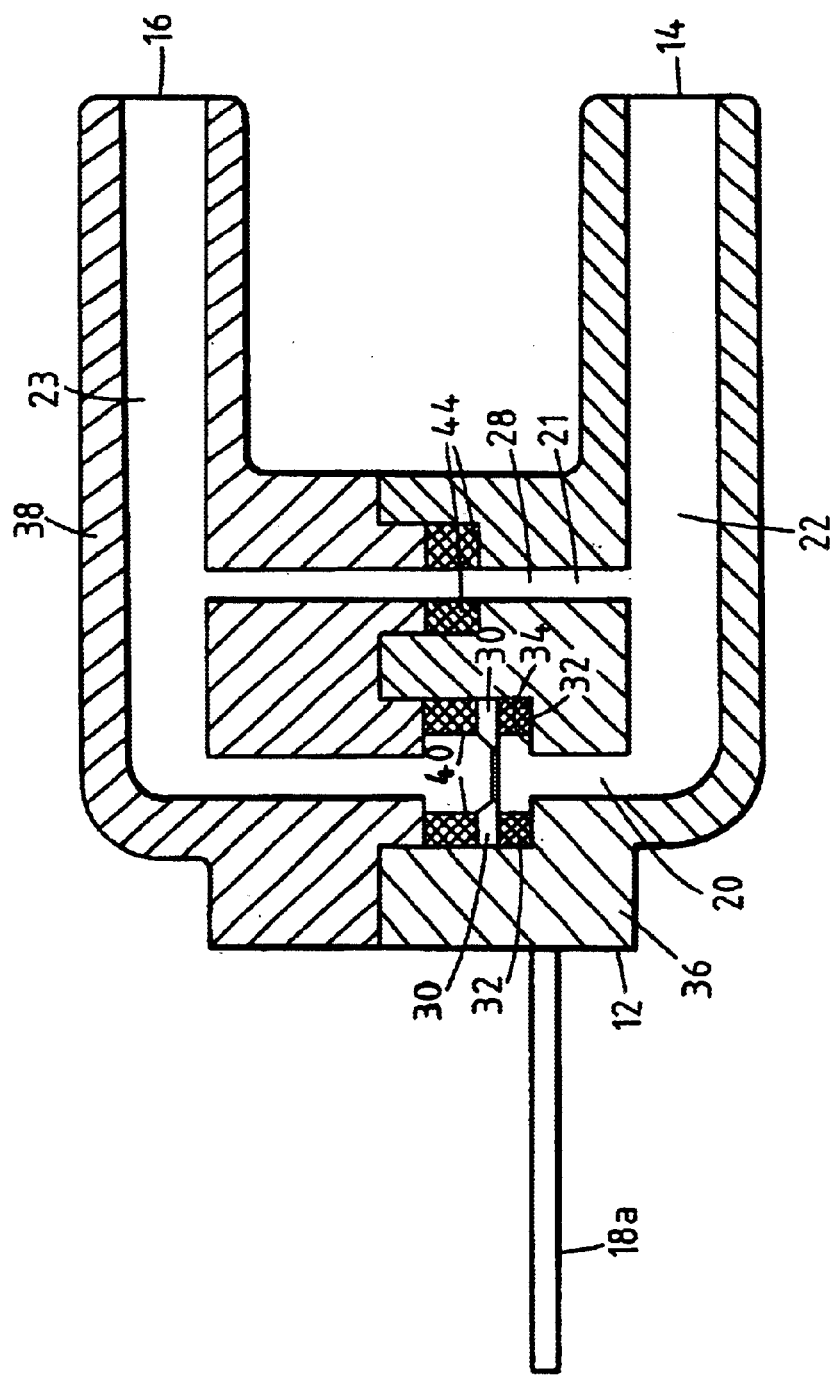
FIG. 2 illustrates a cross sectional side view of the flow sensor of FIGS. 1a and 1b in additional detail.

As shown in FIG. 2, one embodiment of the flow sensor package 10 generally includes the housing 12, the first and second channels 20, 21, the third and fourth channels 22, 23, the restriction 28, the pressure sensing element 30, and an elastomeric seal 32, which has a conductive path to a lead 18a in the manner shown, for example, in aforementioned U.S. Pat. No. 5,184,107. The housing 12 has an alignment well 34 in the first channel 20 between the inlet port 14 the outlet port 16. Although not necessary, because of the third and fourth channels 22, 23, the first and second channels 20, 21 are shown in parallel across the inlet port 14 and the outlet port 16.

The housing 12 is formed by two portions: a base 36 carrying the alignment well 34, the third channel 22, and the inlet port 14, and a cover 38 carrying the outlet port 16 and the fourth channel 23. Those skilled in the art will realize that the housing can be integrally molded or can have additional components. The alignment well 34 is configured to support the elastomeric seal 32, another elastomeric seal 40, and the pressure sensing element 30. The pressure sensing element 30 is positioned between the elastomeric seals 32, 40 within the alignment well 34 in order to prevent flow through the first channel 20. The elastomeric seal 32, which has a conductive path from the pressure sensing element 30 to the lead 18a that extends outside of the housing 12 to couple to the measuring apparatus 26, rests in the alignment well 34 of the base 36. The pressure sensing element 30 is oriented so that it is electrically coupled to the conductive elastomeric seal 32 and so that the elastomeric seal 40 rests on the pressure sensing element 30. The pressure sensing element 30 can be, but is not limited to, a square chip as described in U.S. Pat. No. 5,184,107 issued to Dean J. Maurer on Feb. 2, 1993. The configuration between the conductive elastomeric seal 32, the elastomeric seal 40, and the pressure sensing element 30 is described in detail in U.S. Pat. No. 5,184,107. The first channel 20 is sealed at the interface between the base 36 and the cover 38 by the elastomeric seals 32, 40 that can be, but are not limited to, silicone, ethyl-propylene (EPDM), nitrite, viton, butadiene, combinations thereof, etc. The second channel 21 is sealed at the interface between the base 36 and the cover 38 with elastomeric seals 44 that can be the same material referred to above. The elastomeric seals 32, 40, 44 prevent leakage out of the flow sensor package 10. The cover 38 can be arranged to snap onto the base 36 to form a complete flow sensor package 10, which allows a fluid to enter through the inlet port 14, to flow through the restriction 28, and to exit through the outlet port 16.

A fluid enters the flow sensor package 10 through the inlet port 14 carried by the base 36. The fluid flows through the restriction 28 in the second channel 21, which allows the fluid a bypass path through the flow sensor package 10. The elastomeric seal 44 prevents leakage of the fluid from the second channel 21, thereby allowing the restriction 28 to create a pressure change across the pressure sensing element 30. Accordingly, the pressure sensing element 30, which prevents flow of the fluid through the first channel 20, measures the pressure change across the pressure sensing element 30 and provides an electrical output signal to the conductive elastomeric seal 32. The conductive elastomeric seal 32 is electrically coupled to the measuring apparatus 26 through the lead 18a so that the signal from the pressure sensor element 30 reaches the measuring apparatus 26. Along with the elastomeric seal 40, the conductive elastomeric seal 32 prevents leakage of the fluid from the first channel 20.

With this arrangement, the pressure sensing element 30 is integrated with the restriction 28 in the housing 12 and is sealed by elastomeric seals 32 to form a low-cost, highly-manufacturable flow sensor package 10 to measure the flow rate of a fluid.

Certain modifications of the present invention have been discussed above. Other modifications will occur to those practicing in the art of the present invention. For example, as illustrated in the drawings, the inlet port 14 and the outlet port 16 have axes that form right angles with respect to the axes of the first and second channels 20, 21. However, the housing 12 can be arranged so that the inlet port 14 and the outlet port 16 have axes that are parallel to the axes of the first and second channels 20, 21. Further, for example, those skilled in the art will realize that channels 20 and 21 can be reversed so that the channel 20 is in the center of the drawings shown in FIGS. 1a, 1b, and 2 (i.e., the sensing element 30 will be in what is shown as channel 21 in FIG. 2 with appropriate changes made to the configuration of flow sensor package 10). Also, sensing element 30 can be placed in any variety of locations, such as, for example, in channel 22 to the left of channel 21 in FIG. 2 (perpendicular to the flow).

Referring to FIG. 3, there is shown an alternate embodiment of a flow system incorporating a flow sensor in accordance with the present invention. In the embodiment shown in FIG. 3, the first and second channels 20, 21 are not parallel to one another. The first and second channels 20 and 21 communicate with the inlet port 14 and the outlet port 16 by way of the third and fourth channels 22, 23. The inlet port 14 is adapted to receive a fluid such as a liquid, and the outlet port 16 can be adapted to discharge the fluid from the flow sensor package 10. Restriction 28 is shown in a Venturi configuration (bypass flow channel), which greatly increases velocity but can also reduce pressure and which can be adjusted. The lead 18a is coupled to a measuring apparatus 26 (not shown) such as, but not limited to, a microprocessor, a meter, etc.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The embodiments of an invention in which an exclusive property or right is claimed are defined as follows:

1. A flow sensor package comprising:
    a housing having an inlet, an outlet, and first and second channels in communication with the inlet and the outlet;
    a sensing element in the first channel;
    a restriction in the second channel; and
    a seal engaging the sensing element so as to prevent flow of a fluid past the sensing element, wherein the seal has an electrically conductive path from the sensing element to a lead, and wherein the lead is outside of the housing.

2. The flow sensor package of claim 1, wherein the housing includes a base and a cover.

3. The flow sensor package of claim 2, wherein the seal comprises a pair of elastomeric seals, wherein the sensing element is captured between the elastomeric seals, and wherein the elastomeric seals are arranged to prevent leakage between the base and cover.

4. The flow sensor package of claim 1, wherein the seal comprises a pair of elastomeric seals, and wherein the sensing element is captured between the elastomeric seals.

5. The flow sensor package of claim 1, wherein the fluid is a liquid or a gas.

6. The flow sensor package of claim 1, wherein the inlet, the outlet, and the second channel are arranged to permit a flow of the fluid through the housing between the inlet and the outlet, and wherein the sensing element is arranged to sense a pressure change across the restriction.

7. The flow sensor package of claim 1, wherein the inlet, the outlet, and the second channel are arranged to permit a bidirectional flow of the fluid through the housing between the inlet and the outlet, and wherein the sensing element is arranged to sense a pressure change across the restriction.

8. The flow sensor package of claim 1, wherein the seal comprises an elastomeric seal.

9. The flow sensor package of claim 1, wherein the seal comprises a perimeter commensurate with a perimeter of the sensing element.

10. The flow sensor package of claim 4, wherein the seal is coaxial with the sensing element.

11. The flow sensor package of claim 1, wherein the seal is coaxial with the sensing element.

12. A flow sensor package comprising:
    a housing, an inlet, an outlet, and first and second channels in communication with the inlet and the outlet;
    a sensing element in the first channel, wherein the sensing element has first and second opposing sides, wherein the first side is in fluid communication with the inlet, and wherein the second side is in fluid communication with the outlet;
    a restriction in the second channel, wherein the restriction permits flow of a liquid through the inlet, the second channel, and the outlet; and
    a seal engaging the sensing element so as to prevent flow of the liquid past the sensing element, wherein the sensing element senses a pressure change across the restriction.

13. The flow sensor package of claim 12, wherein the housing includes a base and a cover.

14. The flow sensor package of claim 13, wherein the seal comprises a pair of elastomeric seals, wherein the sensing element is captured between the elastomeric seals, and wherein the elastomeric seals are arranged to prevent leakage of the liquid between the base and cover.

15. The flow sensor package of claim 12, wherein the seal comprises a pair of elastomeric seals, and wherein the sensing element is between the elastomeric seals.

16. The flow sensor package of claim 12, wherein the inlet, the outlet, and the second channel are arranged to permit a flow of the liquid through the housing between the inlet and the outlet.

17. The flow sensor package of claim 16, wherein the seal has a conductive path from the sensing element to a lead, and wherein the lead extends outside of the housing.

18. The flow sensor package of claim 12, wherein the inlet, the outlet, and the second channel are arranged to permit a bidirectional flow of the liquid through the housing between the inlet and the outlet.

19. The flow sensor package of claim 18, wherein the seal has a conductive path from the sensing element to a lead, and wherein the lead extends outside of the housing.

20. The flow sensor package of claim 12, wherein the seal has a conductive path from the sensing element to a lead, and wherein the lead extends outside of the housing.

21. A method of determining flow rate through a flow conductor comprising the following steps of:
    creating a pressure change within a housing having only two separate housing portions;
    sensing the pressure change using a sensing element mounted within the housing;
    sealing the sensing element within the housing using a seal; and
    communicating an electrical signal from the sensing element to an exterior of the housing.

22. The method of claim 21, wherein the sealing step comprises the step of sealing leakage between the two separate portions of the housing.

23. The method of claim 21, wherein the sealing step comprises the step of sealing the sensing element between a pair of elastomeric seals which capture the sensing element therebetween.

24. The method of claim 21, wherein the communicating step comprises the step of communicating the electrical signal from the sensing element through the seal to an exterior of the housing.

25. The method of claim 21, wherein the step of creating a pressure change within a housing comprises the step of creating the pressure change within the housing by use of a restriction.

* * * * *